United States Patent [19]

Rorden

[11] Patent Number: 5,442,294
[45] Date of Patent: * Aug. 15, 1995

[54] CONDUCTIVITY METHOD AND APPARATUS FOR MEASURING STRATA RESISTIVITY ADJACENT A BOREHOLE

[75] Inventor: Louis H. Rorden, Incline Village, Nev.

[73] Assignee: Baker Hughes Incorporated, Houston, Tex.

[*] Notice: The portion of the term of this patent subsequent to Feb. 18, 2009 has been disclaimed.

[21] Appl. No.: 49,036

[22] Filed: Apr. 16, 1993

Related U.S. Application Data

[63] Continuation-in-part of Ser. No. 899,020, Jun. 15, 1992, Pat. No. 5,260,662, which is a continuation of Ser. No. 792,040, Nov. 12, 1991, abandoned, which is a continuation of Ser. No. 581,561, Sep. 10, 1990, Pat. No. 5,089,779.

[51] Int. Cl.$^6$ .......................... G01V 3/28; G01V 3/18
[52] U.S. Cl. .................................. 324/339; 324/347; 324/366; 324/369
[58] Field of Search ................ 324/332, 333, 338–345, 324/355–369; 343/720, 725, 729, 787, 853; 166/250, 251, 254, 255; 175/40, 45

[56] References Cited

U.S. PATENT DOCUMENTS 2,919,396 12/1959 McLaughlin et al. .
2,963,640 12/1960 Buckner, Jr. .
3,383,586 5/1968 Hoehn, Jr. .
3,493,850 2/1970 Schuster .
4,451,789 5/1984 Meador .
4,609,873 9/1986 Cox et al. .
4,785,247 11/1988 Meador et al. .................... 324/338

*Primary Examiner*—Sandra L. O'Shea
*Assistant Examiner*—Warren S. Edmonds
*Attorney, Agent, or Firm*—Fishman, Dionne & Cantor

[57] ABSTRACT

The present invention relates to a method and apparatus for measuring current resulting from a magnetic field source (i.e., a transmitter) positioned on a drill collar. A plurality of current detectors are carried on the surface of the drill collar in an insulated relationship thereto. Each of the detectors is positioned to detect the value of current being received by the same from the formation. In this connection, the detectors are positioned at differing longitudinally displaced positions relative to the axis of the drill collar and the transmitting antenna(s), whereby each detects a different value of current. These currents will respectively flow through successively deeper layers of the formation. The longitudinal displacement is directly proportional to the depth of investigation, whereby the depth of investigation is many times the longitudinal distance between the current detector and the corresponding transmitting antenna. This set of measurements then produces an estimate of the resistivity profile of the formation adjacent the borehole.

36 Claims, 9 Drawing Sheets

CONDUCTIVITY METHOD AND APPARATUS FOR MEASURING STRATA RESISTIVITY ADJACENT A BOREHOLE

CROSS-REFERENCE TO RELATED APPLICATIONS

This application is a continuation-in-part of U.S. application Ser. No. 899,020 filed Jun. 15, 1992, now U.S. Pat. No. 5,260,662 which is a Continuation of U.S. application Ser. No. 792,040 filed Nov. 12, 1991, now abandoned, which is a Continuation of U.S. application Ser. No. 581,561 filed Sep. 10, 1990 now U.S. Pat. No. 5,089,779.

BACKGROUND OF THE INVENTION

The present invention relates to underground geologic and fossil fuel investigations and, more particularly, to a method and apparatus for determining the electrical resistivity of a formation in a borehole.

Electrical resistivity of formations surrounding boreholes is important in geological studies and investigations for fossil fuels. Because differing materials which might make up a formation have different resistivities, a measurement of the resistivity provides an indication of the formation make-up.

There now are basically two different approaches for measuring resistivity from boreholes. One is to position a so-called "electric" log instrument in the borehole. Such instrument forces current from the borehole through the external formation and measures the effect on such current of the make-up of the formation, by detecting resulting voltages at various locations. This type of log has been found to be particularly effective for obtaining resistivity measurements in high-resistivity formations. It often, though, requires a conductive borehole fluid to operate. This approach has also been adapted to measure-while-drilling (MWD) tools by assembling measurement electrodes on the metal drill collar normally provided between the actual drill and the main part of the drill stem. Because such metal drill collars are electrically conductive, the measurement electrodes must be insulated from one another to prevent shorting. The insulation provided on the drill collar in the past for this purpose has been exposed and consequently subject to severe erosion during actual drilling. Instruments and other arrangements utilizing the forced current approach are described in U.S. Pat. Nos. 2,963,640 and 4,451,789.

The second basic approach that has been used has been an induction approach. One or more (typically an array) of solenoids or the like are positioned in the borehole to develop a primary alternating magnetic field in the formation. This will induce a circulating electrical current within the formation, and the resulting secondary magnetic field is measured. This approach is generally effective in low-resistivity formations of the type likely to be encountered in sedimentary basins which contain petroleum reservoirs. Induction log instruments also have been found to work when the borehole includes a high-resistivity fluid. The approach does not lend itself well to MWD, though, because of the necessity of providing deep circumferential cuts or grooves in the outer diameter of the drill collar to avoid easily damaged protrusions. In this connection, it must be remembered that the ability of an antenna to generate a primary magnetic field or to sense an induced secondary field, depends on the amount of non-conducting cross-sectional area that such antenna has. The resulting deep undercuts in the outer diameter of the metal drill collar weakens it unacceptably. U.S. Pat. Nos. 2,919,396; 3,383,586; and 4,609,873 disclose instruments utilizing induction.

Both of these approaches rely on the formation of a primary electromagnetic field which is not distorted because of any electromagnetic conductivities other than those which might be caused by the formation to be measured. Instruments and other constructions utilizing either of these approaches normally operate at frequencies in the range of 10 to 200 kHz. The frequency of operation is high enough to avoid low-frequency noise but low enough to neglect capacitive current components, simplifying the equations that must be solved to obtain a description of the electromagnetic fields in the formation. A version of an induction instrument known as an "electromagnetic wave resistivity" (EWR) instrument has recently come into use. This name derives from its operation at a high enough frequency (about 2 MHz) that capacitive current cannot be neglected, and the equations describing the surrounding fields and the propagating wave modes must be considered. Although the geometry of EWR instruments is generally similar to that of conventional induction instruments, the shallower undercut permitted by its high-frequency operation has resulted in its use with standard MWD collars. However, the attenuation of waves travelling in a conducting formation increases with frequency. The result has been EWR arrangements provide lower depth of investigation in low resistivities than typically are of interest. As an example of the attenuation, at a resistivity of 0.2 ohm-meters the attenuation is greater than one decibel per inch of travel. In this connection, it also must be remembered that during MWD measurement it is necessary that the primary electromagnetic field which is induced travel through fluid (typically called a drilling "mud") which is circulated through the borehole.

SUMMARY OF THE INVENTION

The present invention relates to a method and apparatus for measuring current resulting from a magnetic field source (i.e., a transmitter) positioned on a drill collar. A plurality of current detectors are carried on the surface of the drill collar in an insulated relationship thereto. Each of the detectors is positioned to detect the value of current being received by the same from the formation. In this connection, the detectors are positioned at differing longitudinally displaced positions relative to the axis of the drill collar and the transmitting antenna(s), whereby each detects a different value of current. These currents will respectively flow through successively deeper layers of the formation. The longitudinal displacement is directly proportional to the depth of investigation, whereby the depth of investigation is many times the longitudinal distance between the current detector and the corresponding transmitting antenna. This set of measurements then produces an estimate of the resistivity profile of the formation adjacent the borehole.

It will be recognized that the above current measuring technique is the result of using a magnetic field source that is not axially symmetric, i.e., that is off-axis relative to the borehole axis. The off-axis relationship of one or more of the antennas may also allow determination of bedding plane dip and the direction of a bedding plane.

The transmitting antenna(s) is not positioned circumferentially about the drill collar. Rather, it is placed in a groove or the like on the drill collar's exterior surface. In this connection, the antenna can be generally elongated and preferably include a magnetic core. As brought out above, in the past it has been necessary to provide relatively deep cuts or grooves in the outer diameter of a drill collar to, among other things, provide the non-conducting cross-sectional area for the antenna that is required. The instant invention allows the inclusion of a magnetic core to concentrate the flux, thereby reducing the cross-sectional area that is needed.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
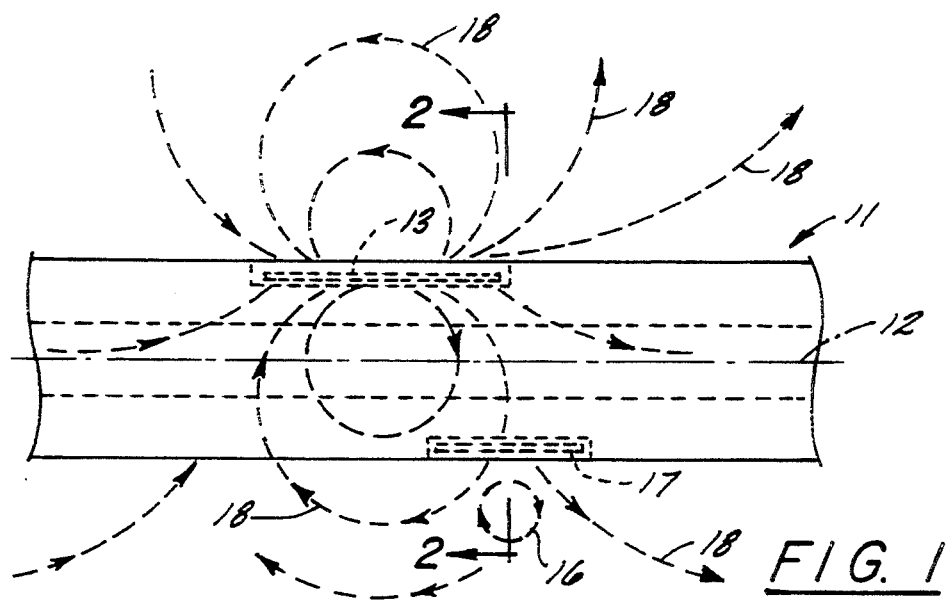
FIG. 1 is a schematic, broken side elevation view of a drill collar illustrating the invention.
Figure 2:
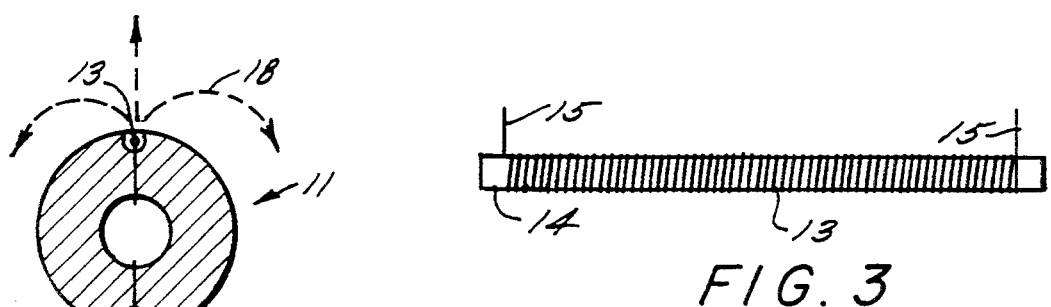
FIG. 2 is a sectional view taken on a plane indicated by the lines 2—2 in FIG. 1.
Figure 3:
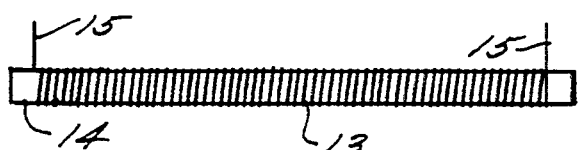
FIG. 3 is a schematic elevation view of an antenna of the type utilized with the invention.

FIGS. 1 and 2 illustrate the fundamental principles of the instant invention, and FIG. 3 is included for a better understanding of the same. With reference to FIGS. 1 and 2, a schematic representation 11 of a metal drill collar is illustrated. As is known, such a drill collar is located between the drilling stem or pipe and the drilling bit during the formation of a borehole. Collar 11 includes a main axis 12 which when the structure is within a borehole is meant to be generally coincident with the borehole central axis, i.e., a line drawn centrally through the borehole along its length. Collar 11 is typical in that it is metal - metal is generally used for drill collars to impart weight and strength.

MWD (Measure-While-Drilling) is accomplished by instrumentation which is associated with the metal drill collar. As mentioned above, the two approaches which have been used in the past to measure the resistivity of a formation surrounding the borehole have not been adapted satisfactorily to MWD operation. One reason for this is that, because the drilling collar typically is electrically conductive, induction type approaches have required a relatively deep circumferential groove to be formed in the drill collar to house the antenna(s).

The present invention takes advantage of the electrically conductive nature of the drill collar. It has been found that if the transmitting antenna(s) is positioned off-axis of the main axis of the collar, i.e., radially offset from the borehole central axis, a changing (i.e., time-varying) primary magnetic field is formed which has loci of axial component minimal on the collar surface. That is, a "primary" magnetic field is formed which has a location at which the direction of the axial component of the field nominally in-phase with the antenna field will reverse. The locus of this reversal is referred to herein as a "directional null". Since the magnetic field of the transmitting antenna induces a current in the metal collar itself, the primary magnetic field as used herein is actually a composite field made up by the superposition of the magnetic field created by the transmitting antenna directly, and the secondary field created by the current which is induced in the conducting collar.

Most desirably, the transmitting antenna 13 is located on or near a surface of the drill collar by, for example, being placed within a groove as illustrated. As shown in FIG. 3, such transmitting antenna 13 is made up of an elongated cylindrical or rod shaped magnetically highly permeable core 14 which is spirally wrapped with conductive wire 15. This construction will result in optimum flux transmission since flux in the antenna itself formed by current flowing through the wire 15 will be concentrated by the rod 14.

It has been determined that a directional null represented at 16 will be formed on the surface of the drill collar circumferentially about the same. The detecting antenna for detecting the field produced by the current induced in the formation is positioned at a location relative to such null at which such secondary magnetic field is distinguishable from the primary magnetic field. Moreover, for maximum depth of investigation when a single detecting antenna is used, it is preferable that it be diametrically opposite the transmitting antenna. Antenna 17 is such a detecting antenna. Its construction is similar to that of the transmitting antenna 13. Most desirably it is decoupled from the primary magnetic field by being positioned right at the null. It must be remembered, though, that such detecting antenna has a finite length, and when there is discussion in this document about positioning the detecting system at the null it is meant positioning the detecting antenna for nominal zero output.

Although a perfect directional null theoretically will occur, this is with the assumption that the collar is a perfect conductor. The practical case of finite conductivity results in a very deep minimum, but with some residual quadrature component which must be compensated for to assure proper operation.

Field lines 18 are superimposed on the drawing in FIG. 1 to show the nature of the primary magnetic field. This field is a composite of the field created outside the collar by the transmitting antenna, and a projection on the plane of such field, of the secondary field caused by current induced in the conducting collar. As shown, the field at the surface and outside the collar in the transverse bisecting plane of the transmitting antenna 13 is everywhere axial and directed oppositely to the field in the antenna core. It will be recognized that the directional null locus in fact circumscribes the metal collar. Moreover, there will be two null loci that are formed about a plane bisecting the transmitting antenna, axially symmetric of the collar 11 relative to the collar's main axis 12. Simultaneous resistivity measurements therefore can be made with axial separation. These could be used as array elements to synthesize different investigation patterns, or on a rotating collar to assist in determining apparent bedding plane dip.

Figure 4:
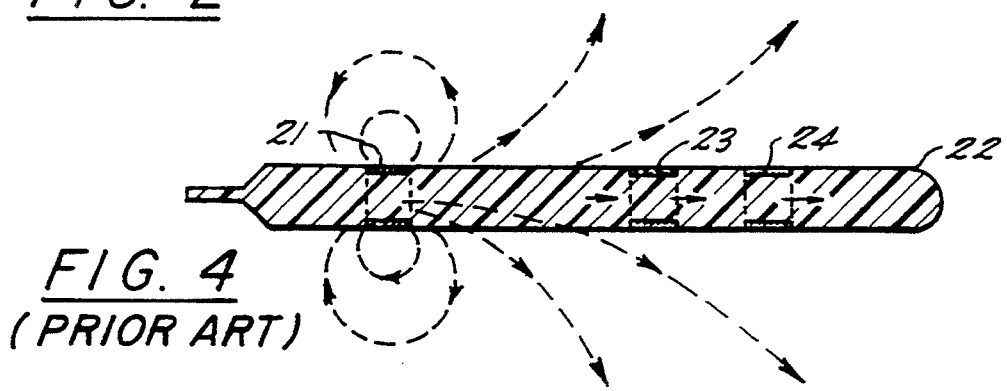
FIG. 4 is a view similar to FIG. 1 but showing a conventional wire-line induction instrument for making resistivity measurements.

FIG. 4 is included to facilitate an understanding of the instant invention. It illustrates the field formed by a conventional wire line log arrangement. Such arrangement includes a transmitter coil 21 which is embedded in a non-electrically conducting, elongated body 22. Since such body is non-conductive, the magnetic flux pattern of the primary field formed by the transmitter coil 21 will not be "distorted" by the existence of such body. Although for simplicity the magnetic flux pattern is only shown in two dimensions, it will be recognized that there is a three-dimensional magnetic flux pattern which is simply an axially-symmetric figure of revolution of that shown.

A conventional arrangement as shown in FIG. 4 typically includes two separate receiver coils. These coils, represented at 23 and 24, are positioned on the body so that the current induced in the same will be in phase. The amplitudes of the current caused by the primary magnetic field will be approximately inverse to the cube of their respective distances from the transmitting coil 21. To eliminate primary field bias of the log output, the direct coupling of the primary field is cancelled out by using the appropriately weighted differences of signals induced in these two coils. In other words, it is necessary to have two receiving coils to enable elimination of primary field bias. Two receiving coils are not necessary for the instant invention, although, if desired, multiple detecting (or transmitting) antennas may be used to synthesize different depth/resolution patterns. Moreover, the scheme of the instant invention enables one to place the detecting and transmitting antennas much closer to one another and takes much less power than a conventional arrangement.

Figure 5:
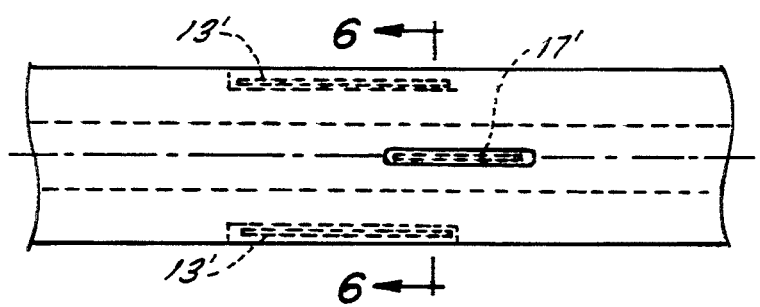
FIG. 5 is a view similar to FIG. 1 showing an alternate configuration of antennas.
Figure 6:
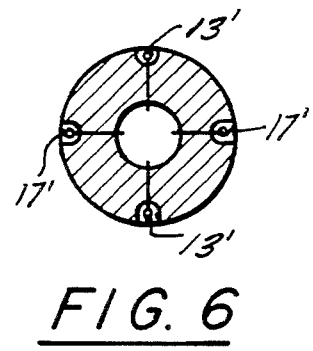
FIG. 6 is a sectional view similar to FIG. 2 taken on a plane indicated by the lines 6—6 in FIG. 5.

FIGS. 5 and 6 illustrate a simple array using two transmitting antennas 13' which are diametrically opposed to one another and two receiving antennas 17' which are also diametrically opposed to one another, but in a plane perpendicular to the plane of the transmitting antennas. The simplest electrical configuration for this array is one in which each antenna pair is connected either in parallel or in series, resulting in a single transmitting channel and a single receiving channel. This geometry is less sensitive to circumferential inhomogenities of formation resistivity than the unsymmetrical configuration illustrated in FIGS. 1 and 2. Moreover, it has somewhat better thin-bed resolution. By the simple expedient of detecting the signals from the two receiving antennas separately and correlating with rotation during rotary drilling by, for example, using data from directional sensors incorporated in the tool, bedding plane dip and strike can be resolved.

Figure 7:
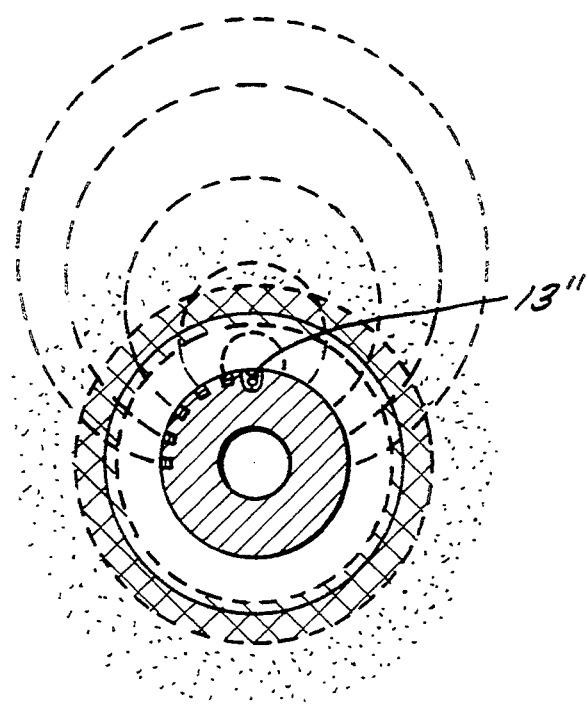
FIG. 7 is a schematic sectional view of an arrangement according to the invention showing the electric field in the formation adjacent a borehole.
Figure 8:
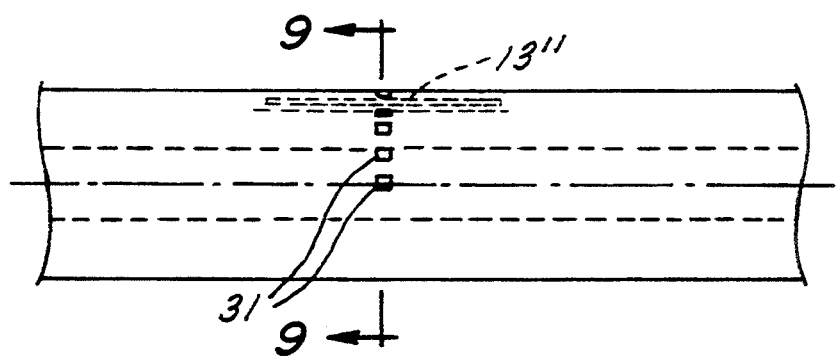
FIG. 8 is a view similar to FIG. 1 showing the antenna arrangement in combination with a current detecting scheme of the invention.
Figure 9:
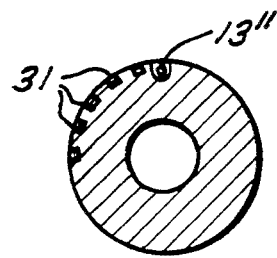
FIG. 9 is a view similar to FIG. 2 taken on a plane indicated by the lines 9—9 in FIG. 8.

The use of a transmitting antenna that is not axially symmetric provides a different approach to resistivity measurement. FIG. 7 is included to facilitate an understanding of this approach. It depicts lines representing the electrical field induced by the primary magnetic field in the vicinity of the central plane of a transmitting antenna 13" in a drill collar represented in cross-section. These electric field lines are superimposed on the radial resistivity zones that can be differentiated adjacent a drilling collar in a borehole. Except for distortions introduced by boundary conditions between zones, conduction currents will tend to follow these electrical field lines. As illustrated, all of the hybrid current paths are intercepted by the collar at a normal incidence required by its high conductivity. This completes the closed conduction paths. In keeping with the invention, an array of electrodes 31 are positioned to intercept these currents, each of which will flow through a successively deeper layer of the formation. This array is best illustrated in FIGS. 8 and 9. It will be appreciated that each of these electrodes is insulated from the collar's surface but is maintained at the collar potential. A set of measurements of these currents will produce an estimate of the radial resistivity profile to a depth of several collar radii into the formation. It should be noted that although the array of electrodes are shown in particular positions on the collar surface relative to the transmitting antenna, other positions on such surface for the electrodes could be selected, depending upon the current it is desired to intercept.

Note that the hybrid current paths illustrated in FIG. 7 are radially well collimated and can therefore provide excellent bedding-plane resolution. In spite of providing relatively shallow investigation, this measurement is useful for lithography while invasion is still shallow. Also, the hybrid profile is useful for borehole-fluid corrections of the deeper investigation provided by the induction mode of the same configuration. Moreover, its radial resolution should aid estimation of formation permeability by tracing the progress of invasion, particularly when a previously-drilled interval is logged back during tripping.

Figure 10:
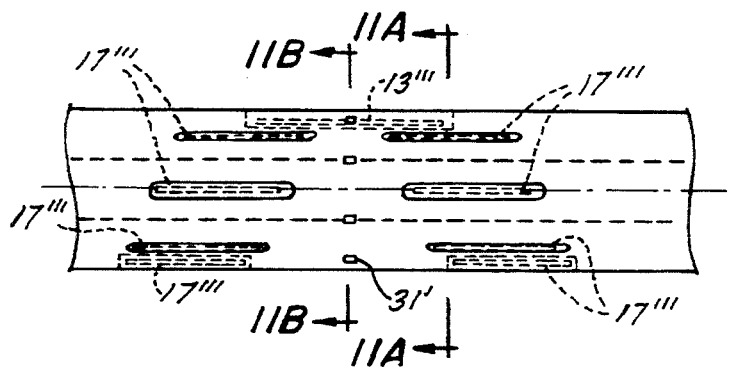
FIG. 10 is another schematic view similar to that of FIG. 1 illustrating a plurality of magnetic field detectors at symmetrically located directional nulls and a plurality of current detectors.
Figure 11A:
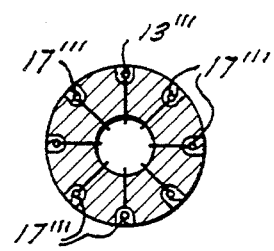
FIG. 11A is a sectional view similar to FIG. 1 taken on a plane indicated by the lines 11A—11A in FIG. 10.
Figure 11B:
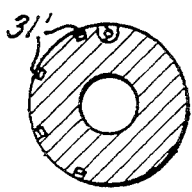
FIG. 11B is another sectional view taken on a plane indicated by the lines 11B—11B in FIG. 10.

FIGS. 10 through 11b show a preferred arrangement combining both the magnetic sensing and current sensing aspects of the invention. A transmitting antenna is represented at 13'''. A plurality of detecting antennas 17''' are positioned circumferentially about the drill collar at the two circumferential directional nulls formed on opposite sides of the transmitting antenna. Moreover, a plurality of detectors 31' are positioned to detect current.

The unique geometries of the invention permit the use of magnetic excitation with current sensing that can be constructed to have very high resolution both circumferentially and axially of the borehole. Although limited to relatively shallow investigation, it can be used to resolve invasion profiles, compensate for borehole effects, and resolve thin beds in a freshly-drilled hole. The combination of magnetic sensing with induced current sensing results in an arrangement which provides both shallow and deep investigations.

Another feature of the instant invention is the presence of a common-mode signal from each receiving antenna that can be used to suppress the residual primary-field response to the nominal directional null. Since this common mode is a direct response to the actual primary field, compensation does not have to be made for the first-order effects of mud resistivity, collar temperature, drive amplitude, etc. Instead, a microprocessor controller can be provided to inject the necessary levels of in-phase and quadrature common-mode into the main signal channel to compensate for the second and higher order null residuals, following a model constructed from test measurements. In other words, the detecting antenna can have a controller for adding constant characteristics of a signal to the current induced in the same, to compensate for signal characteristics caused by the primary magnetic field.

Figure 12:
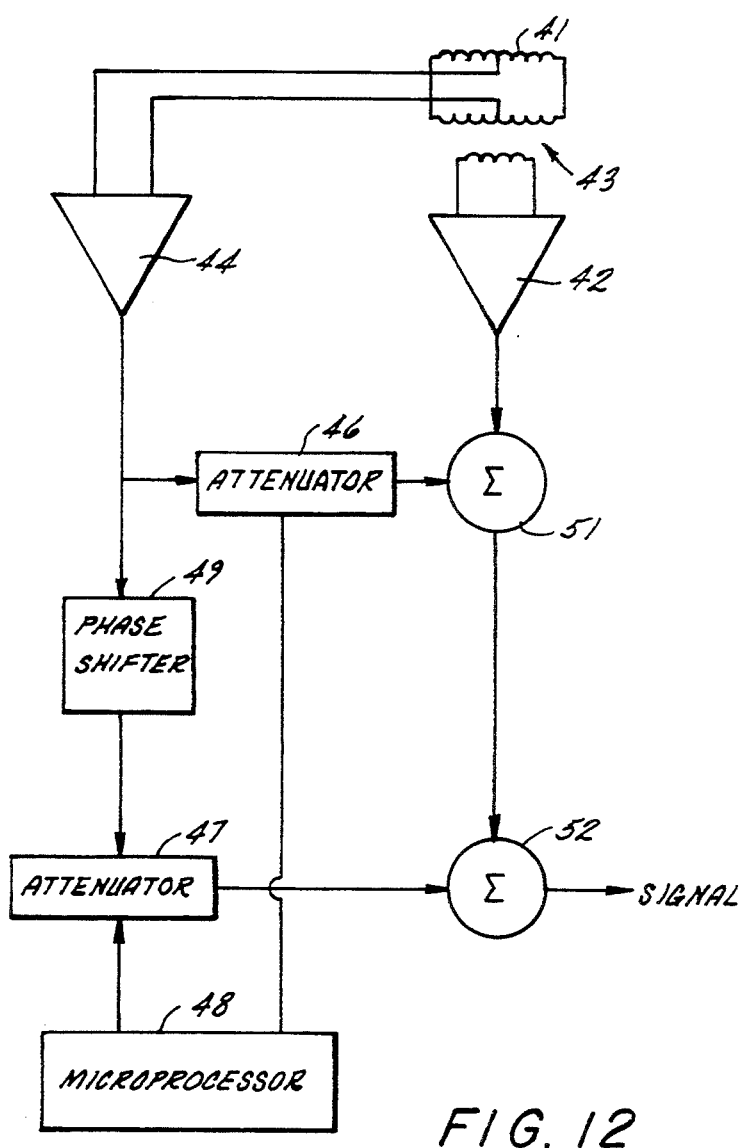
FIG. 12 is a schematic block diagram view of a preferred receiving channel of the invention.

FIG. 12 schematically illustrates such a receiver channel. The current induced by the primary field has a signal value over the length of the receiving antenna(s). However, in the preferred arrangement the receiving antenna(s) span(s) a directional null. Such an antenna, represented at 41, is coupled to a main signal preamplifier 42 through a transformer 43 with a center-tapped primary winding. Since the current induced by the primary field reverses polarity near the antenna center, the common-mode voltage between the antenna and transformer center taps will be proportional to the sum of magnitudes of the response of the antenna halves to the primary field. These will be canceled to the first order. At the same time, the secondary signals of interest will be in phase over the length of the antenna, creating a differential signal that is delivered to the signal preamplifier 42. A common-mode preamplifier 44 is connected between the center taps of the detecting antenna and transformer as illustrated. It amplified the primary field replica, with the secondary response canceled. This preamplifier drives a pair of microprocessor-controlled attenuators 46 and 47 (the microprocessor is represented at 48). As illustrated, attenuator 47 is driven by the preamplifier 44 through a phase-shifting network represented at 49. The attenuators 46 and 47 implement the modelled second-order primary field directional nulls provided by the microprocessor controller. The signals are summed with the output from the main signal preamplifier as is represented at 51 and 52. The output signal is the desired detection signal with the common mode signal removed.

Preferably, preamplifiers 42 and 44 sense current rather than voltage, since short-circuit current is essentially independent of core permeability, which can change with temperature and stress.

It is also preferable to operate this system over a wide range of frequencies, such as from 2 to 200 kHz. The higher frequencies achieve sensitivity for investigation of high resistivity formations but if used alone result in excessive propagation loss and distortion in low resistivities. With microprocessor 48 available, the frequency can be adjusted to maintain adequate sensitivity and consistent depth of investigation with minimum skin-effect correction. A preferred method of achieving this flexibility is to use broad band signal conditioning electronics and multi-phase coherent detection, thereby eliminating the need for multiple filters and preserving both amplitude and phase of the signal without contamination by out-of-band noise.

In addition to the ability to operate over a wide frequency range without degradation, this approach permits simultaneous analysis at multiple frequencies by transmitting a harmonic-rich waveform. For instance, with square-wave drive and a scanning synchronous detector array that samples the signal in contiguous time segments each 1/16th of a cycle long, the amplitude and phase of the fundamental, third, fifth and seventh harmonics may all be determined. A well-known technique which could be used would be the Fast Fourier Transform method. The response could also be analyzed using this detection method, as a transient in the time domain, of course, rather than first transforming it into the frequency domain.

It will be apparent from the above that the invention is an apparatus and a method for a new approach to resistivity measurement which can be used in an MWD collar without weakening it. Because of the unique field pattern which is created, the sensing elements can be placed much closer to the source elements than in conventional induction or electrical approaches. This permits a very short assembly, one-half to one-fourth the length of conventional MWD resistivity logs, and lower power consumption because of the higher efficiency of magnetic-cored antennas and the shorter path travelled by investigation signals.

It will also be seen that antennas can be placed in configurations designed to resolve circumferential inhomogenities of resistivity, such as are encountered in dipping bed measurements, because the investigation patterns are not axially symmetric. By combining channels with different weighting, patterns of various resolutions and depths of investigation can be synthesized simultaneously. The use of asymmetric antenna arrays of the invention permits resolution of bedding planes parallel or inclined to a tool axis. This property is particularly valuable in horizontal drilling where it is frequently desirable to drill at a constant distance from some interface.

The balanced configuration of receiving antennas provided by some implementations of the instant invention results in a strong common-mode response to the primary field, facilitating computer-controlled null compensation. The scanning synchronous detector array allows simultaneous analysis at multiple frequencies or analysis in the time domain.

Although the invention has been described in connection with preferred embodiments, it will be recognized by those skilled in the art that various changes and variations can be made and that the principles are applicable to many resistivity measurement geometries. For example, it can be used in conventional induction log or EWR configurations by replacing each undercut solenoid by a collar containing several magnetic-cored axial antennas of the invention in slots. Such arrangements would have virtually the same responses as the originals. They would benefit from the full-strength collar and from the minimal exposure of insulating material to abrasion.

It will be realized that the primary field pattern could be synthesized by driving several elements simultaneously. This would modify the null loci and the placement of receiving antennas. Moreover, receiving antennas could be located in positions that are not associated with nulls, and appropriate weighting of multiple elements to achieve cancellation could be used, as in conventional logs.

Figure 13:
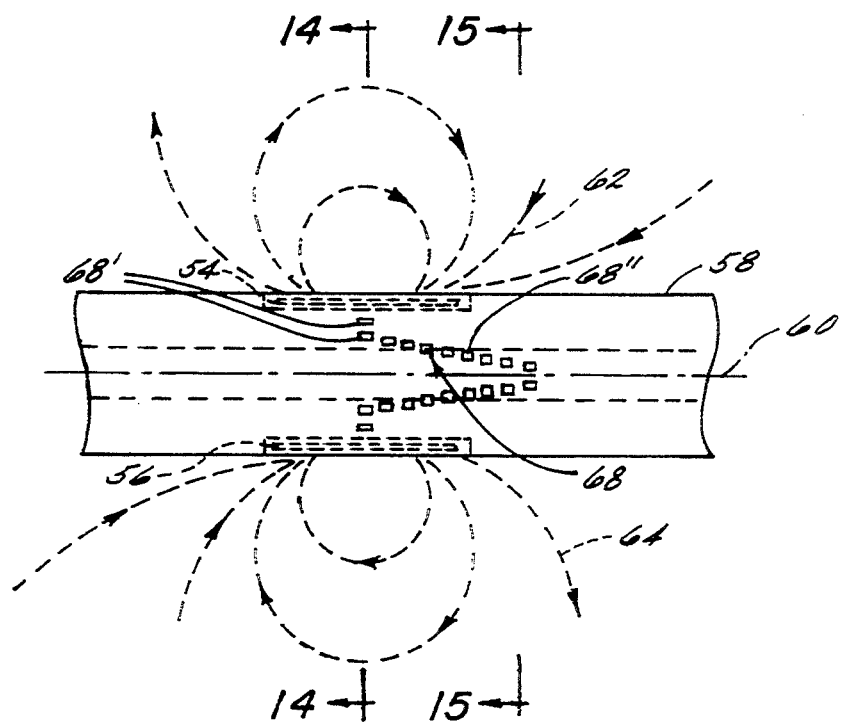
FIG. 13 is a schematic, broken side elevation view of a drill collar illustrating the invention.
Figures 14, 15:
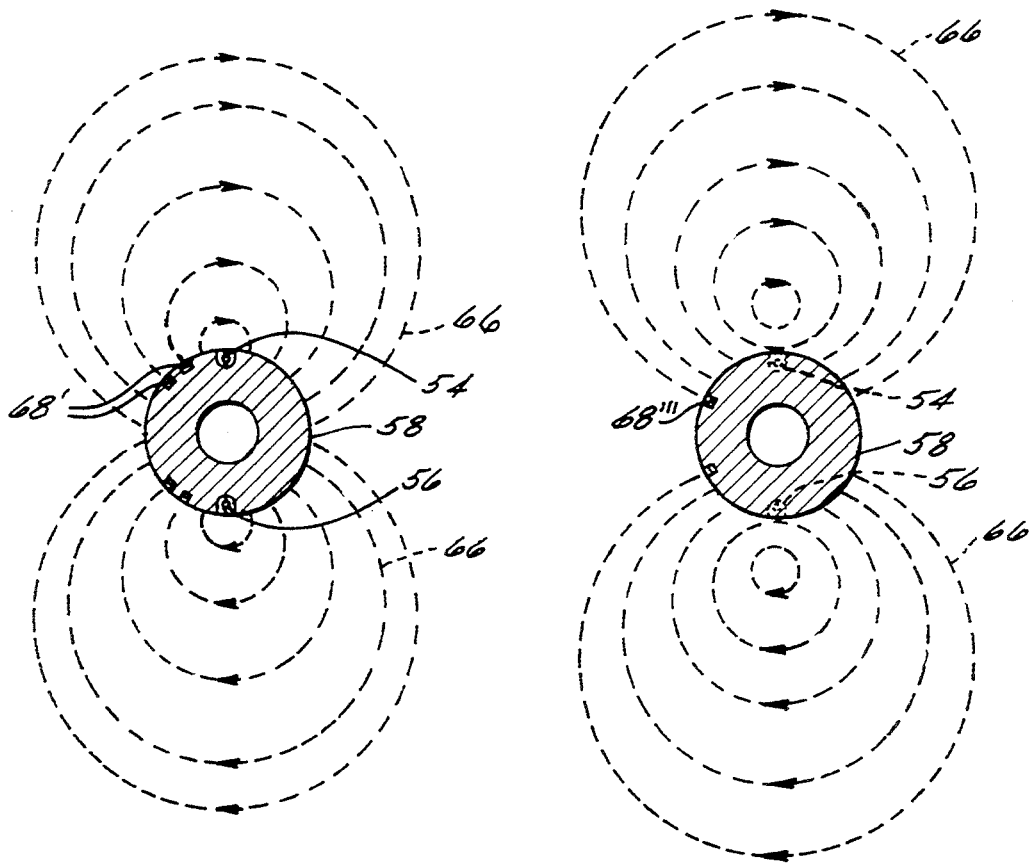
FIG. 14 is a sectional view taken on a plane indicated by the lines 14—14 in FIG. 13.
FIG. 15 is a sectional view taken on a plane indicated by the lines 15—15 in FIG. 13.

Referring now to FIGS. 13–15, in accordance with the present invention, two transmitting antennas 54 and 56 are placed within axial grooves diametrically opposed on a collar 58. Collar 58 includes a main axis 60 and is of the same type as collar 11 described hereinbefore. Each transmitting antenna 54 and 56 is of the same type as transmitting antenna 13 also described hereinbefore. Transmitting antennas 54 and 56 are driven in phase opposition, as indicated by the directional flux plots 62 and 64 respectively, whereby a source field pattern resembling that of a quadrupole is generated. Although not shown, it will be appreciated that the field pattern will be distorted by the presence of the conducting collar 58, as is known. While the flux plots 62 and 64 are only shown in two dimensions, it will be appreciated that these are three-dimensional magnetic flux patterns. Similar field patterns, without the effect of the collar, have been generated, e.g., U.S. Pat. No. 3,493,850 to Shuster, which is incorporated herein by reference. In contrast to the prior art, the present invention is an extension of the hybrid or magnetoelectric application discussed hereinbefore to analyze the spatial distribution of resistivities within a formation. Lines 66 represent the electrical field induced by the changing (i.e., time-varying) primary magnetic field of the transmitting antennas 54 and 56. Except for distortions introduced by boundary conditions between zones, conductor currents will tend to follow these lines. As illustrated, all of the hybrid current paths are intercepted by the collar at a normal incidence required by its high conductivity. This completes the closed conduction paths. In accordance with this embodiment on the invention a plurality of conducting sensor patches (i.e., electrodes) 68 are disposed on the collar surface and are insulated from the collar 58, but maintained at its potential. If these electrodes 68 are small compared to the collar radius, the current intercepted by each one, assuming uniform resistivity, flows in a collimated tube along the electric field lines 66 that terminate on the electrode. Current field lines 66 intercept electrodes 68° on collar 58, as is best shown in FIG. 14.

As is apparent from FIGS. 14 and 15, tubes are defined which represent the primary electric field. These tubes expand radially as the intercepting electrodes 68 are displaced farther from the corresponding transmitting antenna, extending to infinity. It has been determined, that these tubes remain well-collimated in the axial direction, resulting in the ability to measure currents penetrating different radial depths in the formation without axial spreading. By successively determining, each successively deeper resistivity with correction for the portion of current passing through the already determined resistivity of all shallower layers, a radial profile of resistivity in a thin bed is obtained.

Figure 16:
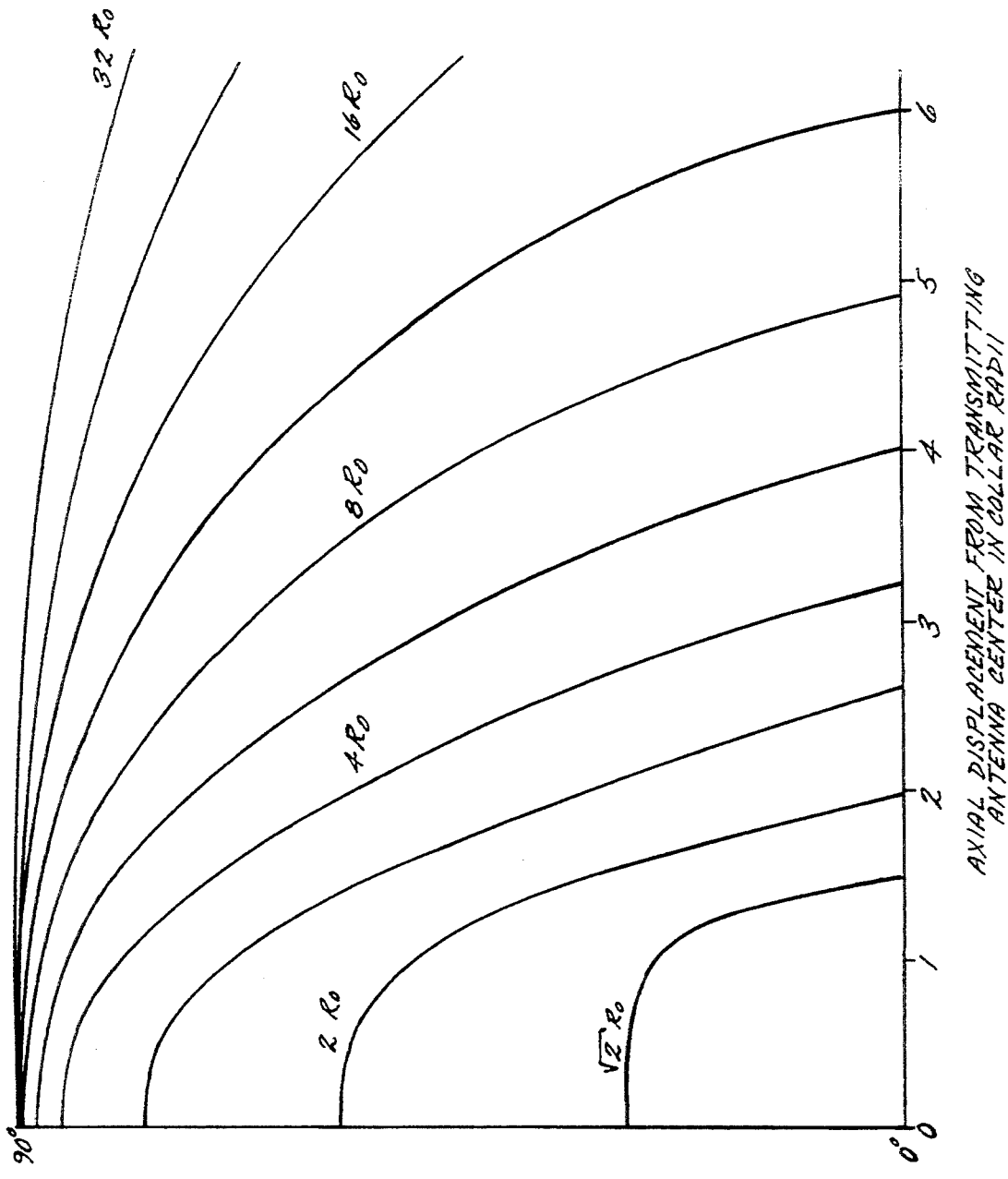
FIG. 16 is a plot showing depths of investigation.

It has also been determined that electrodes 68 placed at circumferential angles less than 90° from an antenna, but spaced axially away from the antenna center, intercept field lines that penetrate even deeper (e.g., electrode 68" in FIG. 15). Electrodes placed at circumferential angles 70° to 80° from the antenna, for example, will intercept field lines penetrating some four to six times their axial displacement from the antenna center. Thus, for example, an electrode sixteen inches from the antenna center on an eight inch collar can intercept field lines penetrating about eighty inches radially from the tool axis 60. FIG. 16 illustrates a mapping of the maximum radii of field lines onto one octant of the collar. It will be appreciated that axial collimation is relatively well-preserved, permitting good thin-bed resolution even at these depths of investigation. Also, since the fields are not axisymmetric like those of conventional prior art logging tools, this method can resolve different formation resistivities in different angular directions around the borehole. As the tool progresses along the borehole, therefore, some degree of three-dimensional imaging of formation resistivity is possible.

Electrodes 68 are not only shown in FIG. 13 about transmitting antenna 54, such electrodes are also shown about transmitting antenna 56. Further, electrodes 68 may be distributed circumferentially from both sides of each transmitting antenna. This permits differential current sensing, increasing sensitivity and cancelling out common mode noise and interferance. Also, electrode 68" may be spaced axially away from the corresponding antenna center in both uphole and downhole directions. While only two diametrically opposed transmitting antennas 54 and 56 have been described, two additional diametrically opposed transmitting antennas (not shown) may be employed. With four transmitting antennas each is positioned about collar 58 at a circumferential angle of 90° from each adjacent one. This configuration would provide quadrantal resolution. The same short-range type sensor electrodes (i.e., those distributed circumferentially in the plane containing the transmitting antenna centers) could be used for both cross axis measurements, by driving the antenna pairs either alternately in time or simultaneously at slightly different frequencies. In accordance with the latter, each measurement time is short enough, whereby tool eccentricity in the borehole could also be measured in real time.

If the tool is rotated significant improvement in angular resolution is possible by deconvolving the apparent resistivities with toolface angle. During rotary drilling this could be accomplished continuously, also while rotating slowly to "drill ahead" with a motor and bent sub or housing. If it is desirable to resolve angular variations of resistivity while changing borehole direction, however, it may be necessary to allow the drillstring to rotate an entire revolution from time to time, or to wobble its angle. If four transmitting antennas are used, a wobble of ±45° would be sufficient, and would not materially reduce the angle build rate. While the quadrupole field structure is most preferable generated by the two diametrically opposed transmitting antennas 54 and 56, other configurations may be employed. Alternatively, an array of three transmitting antennas spaced equiangularly, would suffice to resolve tool eccentricity. By driving the two of these antennas at half amplitude and opposite phase to the third antenna, a field will be generated which provides finer angular resolution than the two transmitting antenna array described above, (e.g., at least for the shallower depths of investigation). Alternatively, three of the antennas in a four antenna array (described above) could be driven to cancel the dipole moment of the fourth antenna and shape the resulting field as desired. With equal but alternating polarity drive, an octupole field would be generated with very fine angular resolution, but very limited depth of investigation. Further, the antennas of a single tool, can be driven electrically to generate a number of different field configurations as will be appreciated by one of ordinary skill in the art.

For distances large compared with the dimensions of the transmitting antenna, the quadrupole magnetic field described above will approach an inverse fourth power decay with distance resulting in an inverse cubic decay of the electric field and an inverse square decay of potential per unit circumferential angle. For the octupole field (i.e., four circumferentially equally spaced axially placed transmitting antennas described above) each of these powers is increased by one; e.g., the magnetic field decays as the inverse fifth power, etc., obviously reducing its effective depth of investigation relative to the quadrupole. Conversely, the magnetic field of a dipole, which is the lowest order source known to exist, decays as the inverse cube of distance. Therefore, its electric field approaches the inverse square, and is clearly capable of deeper investigation than a quadrupole. Conventional prior art induction and EWR logs use such a dipole source, but in a coaxial configuration that results in no intersection of electric field lines with the tool face, so it is not useful for the magnetoelectric log of the present invention. However, a dipole field whose axis is tilted off the tool axis produces intersecting electric field lines, while preserving their inverse-square decay which would permit deeper investigation than the quadrupole described above. The convergence of these field lines as they approach the collar will focus the induced current, resulting in sensitivity falling off less rapidly than the inverse square. In contrast, the sensitivity of a conventional prior art induction or EWR log falls off at least as the inverse cube because of the receiving antennas on the collar. Accordingly, in addition to its three-dimensional resolution, this magnetoelectric log is potentially capable of deeper investigation than the prior art conventional types.

Figure 17:
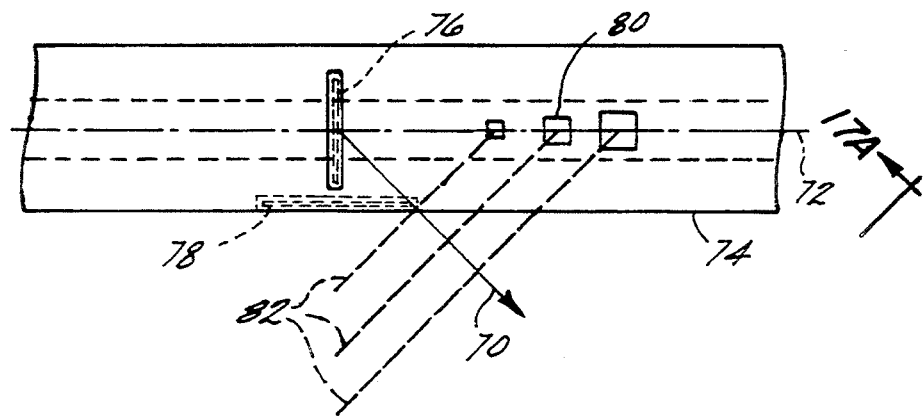
FIG. 17 is a schematic, broken side elevation view of a drill collar illustrating the invention.
Figure 17A:
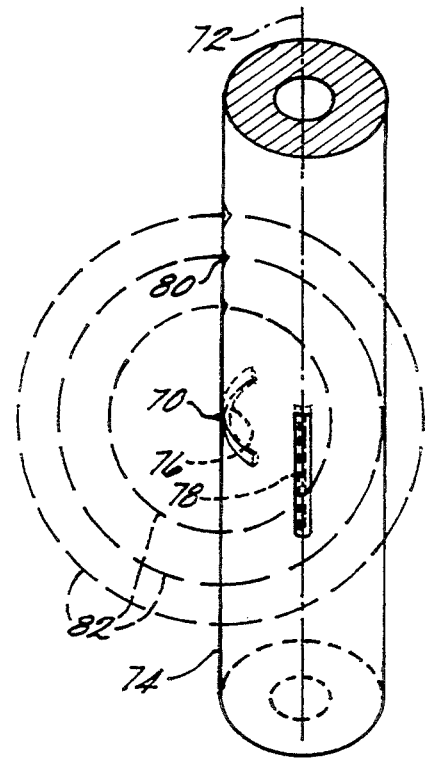
FIG. 17A is a schematic, broken view taken on a plane indicated by the lines 17A—17A in FIG. 17.

In accordance with the present invention, one possible configuration of a deep investigation magnetoelectric log is shown in FIGS. 17 and 17A. A dipole axis illustrated by arrow 70, of the primary field is canted 45° from the center axis 72 of collar 74 (i.e., the tool). This field is generated by a transmitting antenna 76 which is transverse on collar 74 within a groove (e.g. either a circumferential segment(s) or a continuous circumferential core, with multiple windings) and a transmitting antenna 78 is placed within an axial groove on collar 74. Collar 74 is of the same type as collar 11 described hereinbefore. Each antenna 76 and 78 is of the same type as transmitting antenna 13 also described hereinbefore. Electrodes 80 are spaced axially along the tool 74 at a circumferential angle of 90° from the orientation of the radial component of the primary field. Except for the local perturbations due to the presence of the conductive tool body, the loci of primary electric field lines are circles 82 centered on, and contained in planes normal to, the dipole axis 70. The tilted effective dipole axis could also be generated by a single transmitting antenna (e.g. an arcuate segment(s) with multiple windings) tilted or angled on the collar. The maximum radial extent of each field line 70 from the tool axis 72 is thus approximately equal to the axial displacement of its intercept on the tool surface from the dipole, and the locus of these maximum radial penetrations is the plane normal to the tool axis and containing the dipole. Sensitivity can be improved and common-mode interference suppressed by differentially sensing current intercepted by symmetrical electrodes at circumferential angles of 90° and 270°. It will be appreciated as shown in FIGS. 17 and 17A, that the electrodes 76 need not all be of the same size. By increasing their areas with axial distance from the source antenna, deep-investigation sensitivity can be improved at the expense of spatial resolution.

Figure 18:
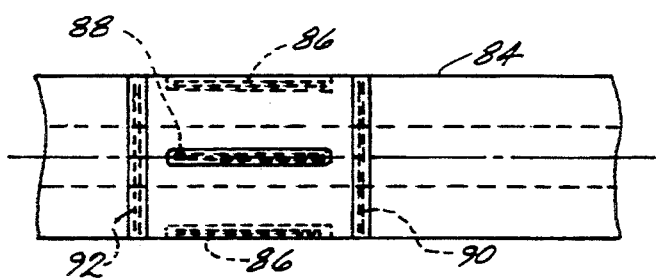
FIG. 18 is a schematic, broken side elevation view of a drill collar illustrating the invention.

Referring to FIG. 18 a combination of the embodiments of FIGS. 13 and 17 is also possible. A collar 84 has two diametrically opposed pairs of transmitting antennas 86 and 88 placed within axial grooves thereon. Further, collar 84 has two transmitting antennas 90 and 92 (e.g., either circumferential segment(s) or a continuous circumferential core, with multiple windings) axially spaced apart and transverse on the collar within a groove. Accordingly, by operating selected transmitting antennas a quadrupole or a tilted dipole field can be generated. Further, driving these segments or coils with selected amplitudes and phases can generate transverse dipole moments in any angular orientation and magnitude, limited only by core saturation or transmitter drive. If the axial antennas are also driven as part of an array, the desired dipole moment can be generated with any axis orientation. By electrically controlling the drive to each coil, any desired dipole or quadrupole orientation can be obtained.

Alternatively, selected transmitting antennas could be operated at different frequencies or in a timed sequence. By driving the transmitting antennas at different frequencies, several patterns could be generated simultaneously, and signal currents intercepted at common sensing electrodes can be separated by well-known techniques to yield multiple simultaneous measurements. It will be readily apparent to one of ordinary skill in the art that other configurations may be employed to generate a wide range of field patterns.

Figure 19:
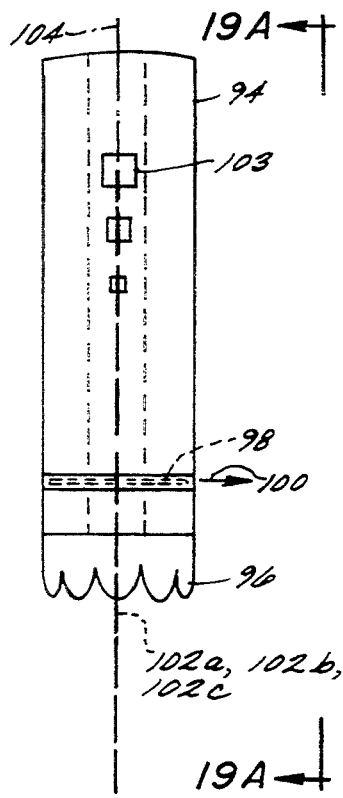
FIG. 19 is a schematic, broken side elevation view of a drill collar and drill bit illustrating the invention.
Figure 19A:
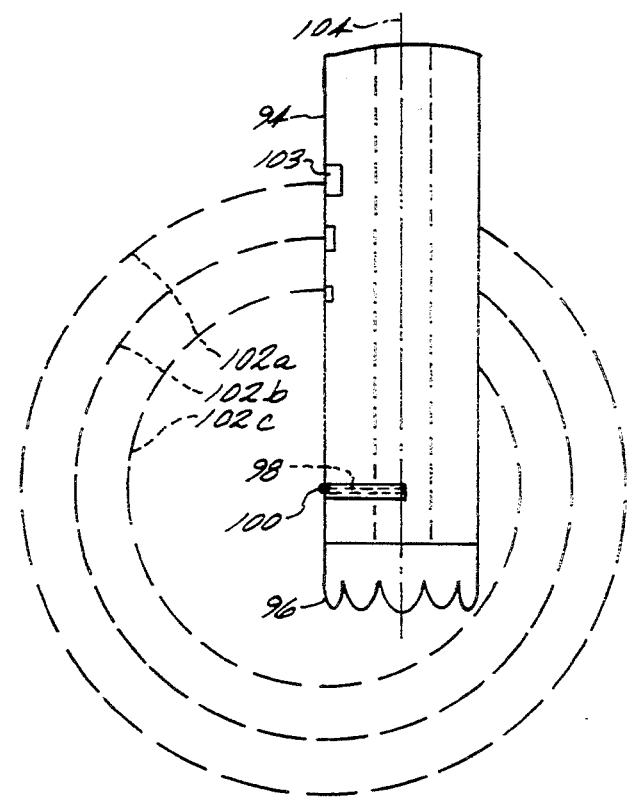
FIG. 19A is a schematic, broken side elevation view taken along the lines 19A—19A in FIG. 20.

Referring to FIGS. 19 and 19A a collar 94 is shown attached to a bit 96 in accordance with rotary drilling. A transmitting antenna 98 (e.g. either circumferential segment(s) or a continuous circumferential core, with multiple windings) is placed transverse on collar 94 within a groove in close proximity to bit 96. A resulting magnetic field vector is indicated by a line 100. Primary electric field lines generated by antenna 98 are circles 102a, 102b and 102c centered on, and contained in planes normal to the dipole axis (i.e., vector 100). As is clearly shown in FIG. 19A these electric field line extend ahead of bit 96. Electrodes 103 are of the same type as described hereinbefore and are spaced axially along collar 94 for intercepting field lines 102a, 102b and 102c (i.e., at a circumferential angle of 90° from the orientation of the radial component of the primary field. These electric field lines intersect collar 94 at a distance from antenna 98 equal to the distance downhole of antenna 98 at the central axis 104 of collar 94, providing measurements of resistivity ahead of bit.

Figure 20:
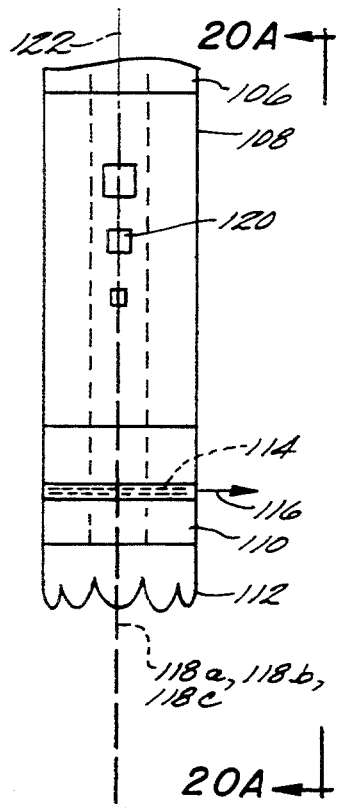
FIG. 20 is a schematic, broken side elevation view of a drill collar, motor housing and drill bit illustrating the invention.
Figure 20A:
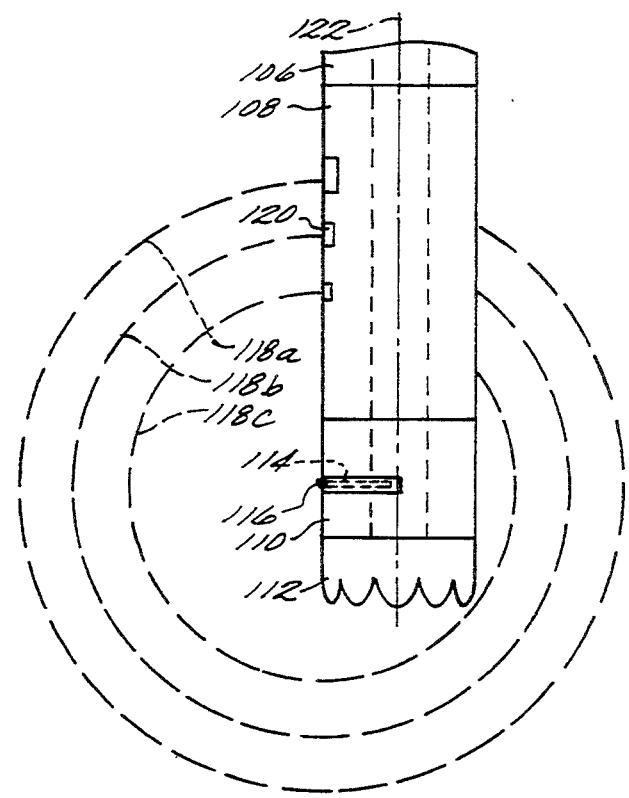
FIG. 20A is a schematic, broken side elevation view taken along the lines 20A—20A in FIG. 20.

However, this configuration may not be suitable for motor drilling. Referring to FIGS. 20 and 20A a collar 106 is shown attached to a motor housing 108, an extension 110 and a bit 112. A transmitting antenna 114 (e.g. either circumferential segment(s) or a continuous circumferential core, with multiple windings) is placed transverse on extension 110 within a groove in close proximity to bit 112. A resulting magnetic field vector is indicated by a line 116. Primary electric field lines generated by antenna 114 are circles 118a, 118b and 118c centered on, and contained in planes normal to the dipole axis (i.e., vector 116). As is clearly shown in FIG. 20A these electric field lines extend ahead of bit 112. Electrodes 120 are of the same type as described hereinbefore and are spaced axially along motor housing 108 for intercepting field lines 118a, 118b and 118c (i.e., at a circumferential angle of 90° from the orientation of the radial component of the primary field. These electric field lines intersect motor housing 108 at a distance from antenna 114 equal to the distance downhole of antenna 114 at the central axis 122 of the drill string. The motor housing 108 will have to be modified to accomodate electrodes 120 since it may not be acceptable to insert an entire logging tool between the motor 108 and the bit 112. Since the motor housing 108 does not rotate relative to the drillstring 106, the electrodes 120 can be connected to an MWD tool above the motor 108. Inclusion of a simple magnetic antenna in the lower end of the housing could provide a rotation reference for maintaining the transmitter orientation or decommutating the electrode currents and, incidentally, a motor tachometer. The latter is particularly useful if the motor is a turbine rather than a positive displacement type.

Figure 21:
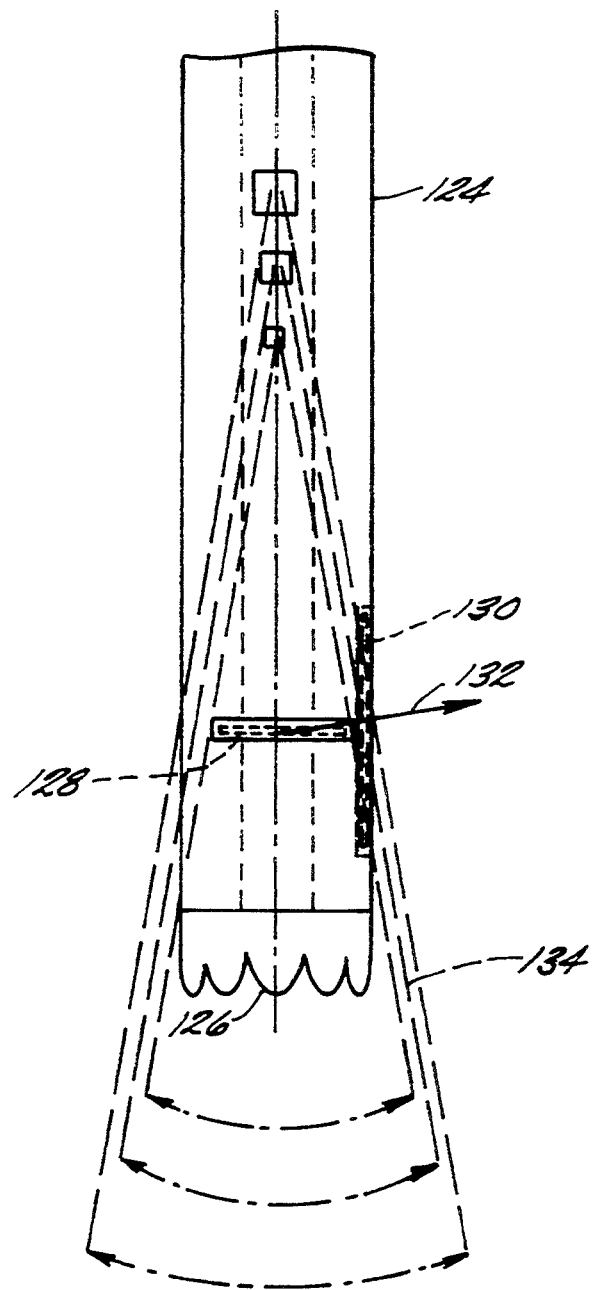
FIG. 21 is a schematic, broken side elevation view of a drill collar, motor housing and drill bit illustrating the invention.

An enhancement of this ability to "look" ahead of the bit results from adding a small axial component to the source antenna. Referring to FIG. 21 an embodiment of the present invention similar to the embodiment of FIG. 17 is shown. A collar 124 has a bit 126 attached thereto in accordance with rotary drilling. A transmitting antenna 128 (e.g., either circumferential segment(s) or a continuous circumferential core with multiple windings) is placed transverse on collar 124 within a groove in close proximity to bit 126. A transmitting antenna 130 is placed within an axial groove on collar 124 also in close proximity to bit 126. A resulting magnetic field vector is indicated by a line 132. Primary electric field lines generated by antennas 128 and 130 are circles centered on, and contained in planes normal to the dipole axis (i.e., vector 132). The electric field lines extend ahead of the bit as described hereinbefore. Electrodes 134 are of the same type as described hereinbefore and are spaced axially along collar 124 for intercepting the primary electric field lines (i.e., at a circumferential angle of 90° from the orientation of the radial component of the primary field. These electric field lines intersect collar 124 at a distance from dipole axis 132 equal to the distance below dipole axis 132. The effective dipole axis may be rotated about the transverse orientation to sweep a cone 134 around the bit. The dipole axis is rotated by changing the magnitude of the axial component, whereby the cone angle can be adjusted or scanned through the desired range. Further, some degree of the three dimensional imaging is possible as described hereinbefore.

It will be appreciated that whenever a continuous circumferential core with multiple winding is employed for the transverse transmitting antenna, the axial antenna(s) will be axially offset from the transverse antenna.

A tilted effective dipole of FIG. 21, with motor drilling may be configured, by way of example, with a circumferential transmitting antenna on an extension in close proximity to the bottom of the motor housing with an axial transmitting antenna (or several for symmetry) incorporated into the motor housing. Synchronization could be accomplished by periodically switching the axial antennas to receiving mode and updating a tracking oscillator. This mode could also be used for transmitting other information, such as directional or bit-condition sensor data, from the near-bit tool to the motor housing. If a near bit tool is programmed to switch to receiving mode from time to time, two way communication can be established.

Alternatively, if at least two windings are put on a near bit circumferential core, it could simultaneously generate a transverse magnetic dipole field and axial potential in the drillstring. The latter, at a different frequency than the conductivity log is using, could be used for two-way communication around the motor. The other terminal could be either the main conductivity log, using similar dual mode connection of its circumferential cores, or it could be a separate axial current coupling transformer or gap sub associated with the main MWD system. A method for transmitting data measurements a short distance around the components in a drill string is disclosed in U.S. Pat. No. 5,160,925 entitled SHORT HOP COMMUNICATION LINK FOR DOWNHOLE MWD SYSTEM which is incorporated herein by reference.

In MWD applications the data acquired by the above described tool will require extensive processing, preferably downhole, since the rate of acquisition will far exceed any currently available method to either transmit it to the surface (e.g., mud pulse or acoustic telemetry) or store it for later retrieval. The above description has been directed towards ideal conditions, however, the effect of finite-sized antennas, and the effect of surface currents on the conductive collar should be accounted for. A "primary field" can be defined as the resultant of all these effects. An analytical model of the field permits computation of the magnetic vector potential everywhere in the space external to the collar. Currents induced by this primary field in conducting formations then give rise to the secondary field, which is superimposed on the primary field, distorting it. The degree of distortion is determined by both the spatial variations in resistivity and the "skin effect". The latter is a strong function of frequency, and can be made arbitrarily small by choosing a low enough frequency. The skin effect distortion increases as frequency increases and as resistivity decreases. On the other hand, the available current, and therefore sensitivity, increases as frequency increases but decreases as resistivity increases. Except for this loss of sensitivity, the simplest and most accurate solution would be obtained by reducing the frequency to a value rendering skin effect negligible, and solving the remaining geometric problems. In reality, a frequency which compromises between distortion and sensitivity will give the best results, but this compromise frequency will increase with resistivity. Thus, for a log to be effective over a wide range of resistivities, its investigating frequency should be programmable over a wide range, preferably decades.

Regardless of frequency, the inversion of magnetoelectric log data to determine resistivities is most easily done by a method of successive determination, starting with a measurement of the radially shallowest zone, which will usually be the drilling mud. The resistivity estimate for each successively deeper zone can then be corrected for the portions of the current path passing through the shallower zones whose resistivities have already been determined, yielding a detailed profile of resistivity in radial depth. With the antenna array of FIG. 18 driven as two quadrupoles at different frequencies (e.g., simultaneously in four quadrants) correction can also be made for eccentricity of the tool in the hole. Out to a radial depth of several collar radii, these measurements can be confined to a thin planar axial zone. Deeper investigation, as described earlier, will follow conical loci, with the details determined by the electrode placement. Alternatively, with dipole drive, the deepest penetration will remain in the transmitter plane, but the current paths are also extended axially. In either case, by placing the electrodes behind (uphole from) the transmitting array, the shallowest penetrations will first encounter fresh formations while drilling ahead. If there is measurable resistivity contrast in the formation, drilling progress can be tracked by a combination of electrode placement, comparison of quadrupole and dipole measurements, and scanning the dipole axis direction. The earlier shallow measurements can then be used, as before, to correct the later deeper measurements.

Figure 22A:
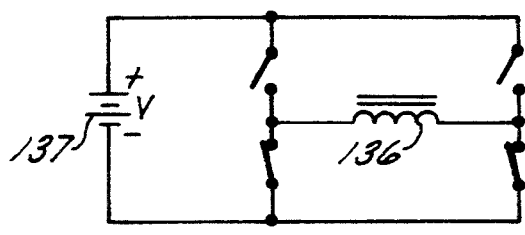
FIG. 22A is an electrical schematic of a drive circuit for an antenna in accordance with the invention.
Figure 22B:
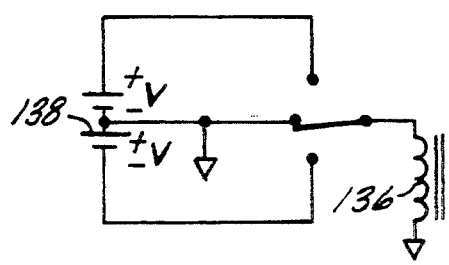
FIG. 22B is an electrical schematic of a drive circuit for an antenna in accordance with an alternate embodiment of the present invention.

Noting that skin effect will be negligible in shallow measurements, even at low resistivities, the investigating frequency should be started at its highest value and reduced, if needed, for successively deeper measurements. The use of thin magnetic cored antenna elements, as described hereinbefore, provide a unique and valuable opportunity to drive the transmitter over a wide range of frequencies at high efficiency, in contrast to the conventional prior art logging coils. The flux concentrating property of the core permits the same total magnetic flux as in a conventional log to be contained in a coil of a very much smaller diameter, thus reducing its ohmic resistance. The power required is therefore greatly reduced, but the antenna impedance remains highly inductive at much lower frequencies than the prior art. This high "Q" results in a very slow decay of current in a short circuited coil. Referring to FIG. 22A (shown in the zero state), by driving an antenna 136 with three voltages (for example, from a source 137), such as +V, −V, and zero using four electronic switches in a full bridge, the circulating current can be essentially "locked in" for variable lengths of time. Alternatively, as shown in FIG. 22B, three electronic switches, such as power FETs could be used to connect the antenna 136 in a programmable sequence to the three voltages of a dual-voltage power supply 138. When it is connected to zero, of course, the antenna 136 is shorted and no current is drawn from the power supply. Also note than when it is first connected to the polarity opposite to the one which established the current, the remaining inductive energy is returned to the power supply before charging in the new polarity begins. An adequate capacitor (not shown) on each power supply bus can maintain ripple at an acceptable level, as is known in the art.

Figure 23:
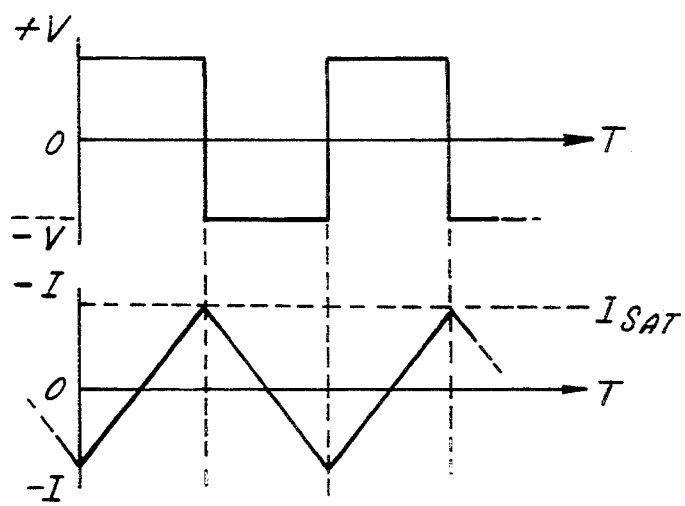
FIG. 23 is voltage and current waveform charts for the circuit of FIG. 22A.
Figure 24:
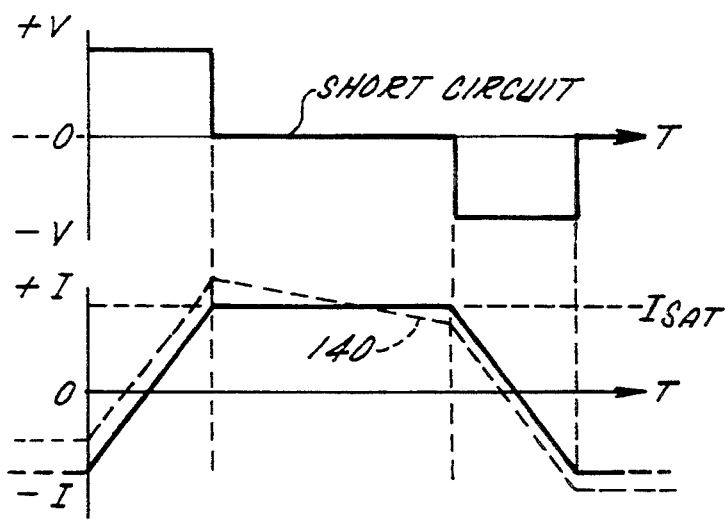
FIG. 24 is voltage and current waveform charts for the circuit of FIG. 22A.

Assuming resistance is very small compared to inductive reactance in the operating frequency range, and further assuming that the peak current is kept below the core saturation level, the current waveform is approximately the integral of the applied voltage. Thus, square-wave drive produces triangular-wave current, as illustrated in FIG. 23. Introducing the shorted times between alternating polarity voltage pulses as in FIG. 24 results in the waveform show, with a droop (shown by a broken line 140) that would result with additional resistance. Pulses of a given voltage and time duration will result in equal changes in current. Therefore, to drive an antenna at constant peak current and variable frequency with fixed voltage supplies, the voltage pulses will always be of the same duration, and only the shorted times will be varied. The magnetic field spectrum, of course, will change, progressing from that of a triangle wave toward that of a square wave until the resistance-induced droop becomes significant. It is a very simple and flexible arrangement, when compared to the conventional variable-voltage or variable-coupling schemes needed to accommodate the reactive load impedance.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for measuring the resistivity of a formation surrounding a borehole, comprising:
   a support member adapted for movement through the borehole;
   at least one antenna means disposed on said support member;
   means for driving said antenna means to provide a changing primary magnetic field within said formation which induces a current in said support member, whereby a secondary field is provided by said current in said support member; and
   at least one current detector means disposed on said support means at a location spaced axially away from a center of said antenna means, said current detector means detecting current values at said location caused by said secondary field.

2. The apparatus of claim 1 wherein said location is spaced axially away from said center of said antenna means and is spaced circumferentially from said center of said antenna means.

3. The apparatus of claim 1 wherein:
   said at least one antenna means comprises a pair of diametrically opposed antennas disposed axially on said support member; and
   said driving means comprises means for driving said antennas in phase opposition to provide said primary field, said primary field comprising a generally quadrupole field.

4. The apparatus of claim 2 wherein said at least one current detector means comprises a plurality of current detector means each spaced axially and circumferentially away from the other.

5. The apparatus of claim 1 wherein:
   said at least one said antenna means comprises,
   (1) at least one first antenna axially disposed on said support member, and
   (2) at least one second antenna circumferentially disposed on said support member; and
   said driving means comprises means for driving said first and second antennas to produce said primary field, said primary field having an effective dipole axis at an angle relative to a center axis of said support member.

6. The apparatus of claim 5 wherein said location is spaced axially away from said center of each of said first and second antennas, said location is spaced circumferentially at a circumferential angle of about 90° from said center of said first antenna.

7. The apparatus of claim 5 wherein said second antenna comprises at least one circumferential magnetically permeable segment having a coil of electrically conductive material disposed around said segment.

8. The apparatus of claim 5 wherein said second antenna comprises a continuous circumferential magnetically permeable core having a coil of electrically conductive material disposed around said core.

9. The apparatus of claim 3 wherein each of said antennas comprises an elongated magnetically permeable core having a coil of electrically conductive material disposed around core.

10. The apparatus of claim 5 wherein said first antenna comprises an elongated magnetically permeable core having a coil of electrically conductive material disposed around core.

11. The apparatus of claim 1 wherein said support member comprises a drill collar.

12. The apparatus of claim 11 wherein:
said drill collar is attached to a drill bit at one end thereof; and
said antenna means is disposed on said drill collar in close proximity to the drill bit; and
said field within said formation includes formation ahead of the drill bit.

13. The apparatus of claim 12 wherein said antenna means comprises a circumferential magnetically permeable segment having a coil of electrically conductive material disposed around said segment.

14. The apparatus of claim 12 wherein said antenna means comprises a continuous circumferential magnetically permeable core having a coil of electrically conductive material disposed around said core.

15. The apparatus of claim 12 wherein:
said antenna means comprises,
(1) a first antenna axially disposed on said drill collar, and
(2) a second antenna circumferentially disposed on said drill collar; and
said driving means comprises means for driving said first and second antennas to produce said primary field, said primary field having an effective dipole axis at an angle relative to a center axis of said drill collar, said driving means including means for varying said angle.

16. The apparatus of claim 1 wherein said driving means comprises:
source means defining three voltage levels; and
means for alternatively selecting between each of said three voltage levels.

17. The apparatus of claim 16 wherein said means for alternatively selecting comprises a three state driver.

18. The apparatus of claim 1 wherein said support member comprises:
a motor housing for driving a drill bit; and
a drill collar extension disposed between said motor housing and the drill bit.

19. The apparatus of claim 18 wherein:
said antenna means is disposed on said drill collar extension in close proximity to the drill bit;

said primary field within said formation includes formation ahead of the drill bit; and
said current detector means is disposed on said motor housing.

20. The apparatus of claim 19 wherein said antenna means comprises a circumferential magnetically permeable segment having a coil of electrically conductive material disposed around said segment.

21. The apparatus of claim 19 wherein said antenna means comprises a continuous circumferential magnetically permeable core having a coil of electrically conductive material disposed around said core.

22. The apparatus of claim 18 wherein:
said antenna means comprises,
(1) a first antenna axially disposed on said motor housing, and
(2) a second antenna circumferentially disposed on said drill collar extension; and
said driving means comprises means for driving said first and second antennas to produce said primary field, said primary field having an effective dipole axis at an angle relative to a center axis of said drill collar section, said driving means including means for varying said angle.

23. The apparatus of claim 1 wherein said current detector means comprises an electrode disposed on said support member, said electrode being electrically insulated from said support member.

24. The apparatus of claim 1 wherein each of said at least one antenna means is disposed within a corresponding groove in said support member.

25. The apparatus of claim 1 wherein:
said antenna means comprises an antenna disposed at an angle between axial and circumferential positions on said support member; and
said driving means comprises means for driving said antenna to produce said primary field, said field having an effective dipole axis at said angle.

26. A method for measuring the resistivity of a formation surrounding a borehole, comprising the steps of:
generating a changing primary magnetic field within the formation from at least one transmitting location within the borehole on a support member adapted for movement through the borehole, said primary field inducing a current in said support member, whereby a secondary field is generated by said current in said support member; and
detecting current values caused by said secondary field at, at least one receiving location spaced axially away from said transmitting location within the borehole.

27. The method of claim 26 wherein said receiving location is spaced axially away from said transmitting means and is spaced circumferentially from said transmitting means.

28. The method of claim 26 wherein said step of generating comprises driving a pair of diametrically opposed antennas disposed on a support member adapted for movement through the borehole in phase opposition to provide said primary field, said primary field comprising a generally quadrupole field.

29. The method of claim 27 wherein said at least one receiving location comprises a plurality of receiving locations each spaced axially and circumferentially away from the other.

30. The method of claim 26 wherein said step of generating comprises driving a first antenna axially disposed at a first one of said at least one transmitting location on said support member and driving a second antenna circumferentially disposed at a second one of said at least one transmitting location on said support member to generate said primary field, said primary field having an effective dipole axis at an angle relative to a center axis of said support member.

31. The method of claim 30 wherein said receiving location is spaced axially away from the center of each of said first and second antennas, said location is spaced circumferentially at a circumferential angle of about 90° from said center said first antenna.

32. The method of claim 26 wherein:
said transmitting and receiving locations are on a drill collar, said drill collar is attached to a drill bit at one end thereof, said transmitting location being in close proximity to the drill bit; and
said primary field within said formation includes formation ahead of the drill bit.

33. The method of claim 32 wherein said step of generating comprises driving a first antenna axially disposed at a first one of said at least one transmitting location on said drill collar and driving a second antenna circumferentially disposed at a second one of said at least one transmitting location on said drill collar to generate said primary field, said primary field having an effective dipole axis at an angle relative to a center axis of said drill collar, said first and second antennas being driven to vary said angle.

34. The method of claim 26 wherein said step of generating comprises:
driving an antenna with a voltage; and
alternatively selecting between three voltage levels for said voltage.

35. The method of claim 26 wherein:
a first one of said at least one transmitting location is on a drill collar extension, said drill collar extension is attached to a drill bit, said first transmitting location being in close proximity to the drill bit;
said receiving location is on a motor housing for driving the drill bit, said drill collar extension is disposed between said motor housing and the drill bit; and
said primary field within said formation includes formation ahead of the drill bit.

36. The method of claim 35 wherein said step of generating comprises driving a first antenna axially disposed at a second one of said at least one transmitting location on said motor housing and driving a second antenna circumferentially disposed at said first transmitting location on said drill collar extension to generate said primary field having an effective dipole axis at an angle relative to a center axis of said drill collar extension, said first and second antennas being driven to vary said angle.

* * * * *